United States Patent
Fitzgerald et al.

(10) Patent No.: US 6,756,914 B1
(45) Date of Patent: Jun. 29, 2004

(54) LOW IMPEDANCE ENCODER FOR A UTILITY METER

(75) Inventors: Aaron Fitzgerald, Faribault, MN (US); Gary Larson, Waseca, MN (US)

(73) Assignee: Itron, Inc., Waseca, MN (US)

( * ) Notice: Subject to any disclaimer, the term of this patent is extended or adjusted under 35 U.S.C. 154(b) by 810 days.

(21) Appl. No.: 09/711,752

(22) Filed: Nov. 13, 2000

Related U.S. Application Data

(60) Provisional application No. 60/165,131, filed on Nov. 12, 1999.

(51) Int. Cl.[7] .............................................. G08B 23/00
(52) U.S. Cl. ........................... 340/870.02; 324/207.13; 324/609; 73/1.16
(58) Field of Search ....................... 340/870.02, 870.03, 340/10.33; 324/207.13, 207.21, 609, 76.39; 73/1.16

(56) References Cited

U.S. PATENT DOCUMENTS

| | | | |
|---|---|---|---|
| 4,064,451 A | 12/1977 | Foxworthy | ............. 324/207.13 |
| 4,475,086 A | 10/1984 | Allen | ........................... 327/38 |
| 4,540,849 A | * 9/1985 | Oliver | ................... 379/106.07 |
| 4,695,840 A | 9/1987 | Darilek | ..................... 340/10.33 |
| 5,155,481 A | 10/1992 | Brennan | ................ 340/870.02 |
| 5,252,967 A | 10/1993 | Brennan et al. | ........ 340/870.02 |
| 6,424,270 B1 | * 7/2002 | Ali | ........................ 340/870.02 |

FOREIGN PATENT DOCUMENTS

| | | |
|---|---|---|
| DE | 19740932 | 4/1999 |
| JP | 03239919 | 10/1991 |

* cited by examiner

*Primary Examiner*—Albert K. Wong
(74) *Attorney, Agent, or Firm*—Patterson, Thuente, Skaar & Christensen, P.A.

(57) ABSTRACT

A low impedance encoder generally comprises a clock source and a switch. The clock source operates according to a predetermined duty cycle. The switch has a first position, closed, and a second position, opened. The duty cycle controls a current flow the switch. A high current flow through the switch indicates that the switch is closed and that the consumption of a utility as registered by the utility meter has occurred; the switch will continue to open and close throughout the process of metering. A low current flow through the switch indicates that the switch is open.

19 Claims, 3 Drawing Sheets

US 6,756,914 B1

LOW IMPEDANCE ENCODER FOR A UTILITY METER

CLAIM TO PRIORITY

The present application claims priority to a U.S. provisional patent application having application no. 60/165,131, filed Nov. 12, 1999, and entitled "Low Impedance Encoder." The identified provisional patent application is hereby incorporated by reference.

FIELD OF THE INVENTION

The present invention relates to encoders and, more specifically, encoders that are utilized with utility meters and that are able to withstand the harsh environments that utility meters are submitted to.

BACKGROUND OF THE INVENTION

Utility meters, such as gas, water and electric meters, their enclosed electronics and batteries are subject to harsh environments including temperature variations that may span 180 degrees Fahrenheit, e.g., −22° to 158° F., humidity variations that can go from 5% humidity to 100% humidity, lightning strikes, rain, snow, and wind. Yet, their operation must be reliable and accurate for appropriate utility monitoring and billing.

With regard to accuracy, perhaps the most important component of a utility meter is its encoder that produces the counts that comprise the consumption reading against which utility customers are billed. As such, in the development and design of utility meters encoder accuracy is a prime factor. Current consumption by the utility meter electronics is also an important factor in the design of meters due to the limited life of the battery supplying power to the electronics.

In response to these factors, the most straightforward utility meter design approach often is to keep the circuits within the meter simple by using high-valued resistors, and a resultant high impedance encoder, to keep current consumption down. However, various types of the contamination of the meter, including contamination by moisture, compromises the operation of the high impedance circuitry and, thus, the operation of the meter. To avoid meter contamination problems, the design approach has historically been to impose constraints on the mechanical design of the meter to create a meter enclosure that will reduce the affects of the meter's environment and to create reliable mechanical components within the meter.

However, utility meter failures of meters utilizing high impedance encoder circuits still occur—encoder counting errors continue to exist due to mechanical failures and/or higher than normal current flow causes a drain on the meter's internal battery. For example, refer to the prior art configuration of a high impedance encoder that has been utilized in gas and electric meters in FIG. 1. The configuration provides for monitoring the switch at all times. When the switch is closed due to correct operation or closed due to faulty operation from contamination the impedance presented is high causing a low current and long battery life. However, faulty operation due to contamination is virtually undetectable unless other components of the utility meter fail as well. As such it has become a realization that getting high impedance encoders to reliably operate in the harsh environment to which utility meters are subject is a very demanding constraint.

Some in the art have recognized the vulnerability of a high impedance encoder within a utility meter and have addressed that vulnerability by the scaling down of the impedance of the encoder. One approach, with a focus on keeping the current consumption of the utility meter electronics controlled, has been to duty cycle the encoder sensor in combination with the scaling down in impedance of the circuitry that is connected to the sensor. This approach is a reasonable one to maintain the encoder count accuracy, however, if the mechanical package of the utility meter is compromised, the current consumption of the utility meter gets very high and ultimately drains the battery resulting in meter failure.

In view of the above, there is a need for a utility meter that maintains a low current consumption via a low impedance encoder whose operation is not substantially affected by harsh environments or contamination.

SUMMARY OF THE INVENTION

The needs described above are in large part addressed by the low impedance encoder for a utility meter of the present invention. The low impedance encoder generally comprises a clock source and a switch. The clock source operates according to a predetermined duty cycle. The switch has a first position, closed, and a second position, opened. The duty cycle controls a current flow through the switch. A high current flow through the switch indicates that the switch is closed and that the consumption of a utility as registered by the utility meter has occurred; the switch will continue to open and close throughout the process of metering. A low (or no) current flow through the switch indicates that the switch is open.

The switch may be located internal to or remote from the encoder. The utility meter may be a water meter, a gas meter, or an electric meter. However, in the preferred embodiment of the invention, the utility meter is a water meter that is located remotely from the encoder and connected thereto by cabling. The use of the duty cycle within the encoder operates to substantially minimize current consumption by the encoder and thereby extend the life of the battery powering the encoder.

DESCRIPTION OF THE PREFERRED EMBODIMENTS

Figure 1:
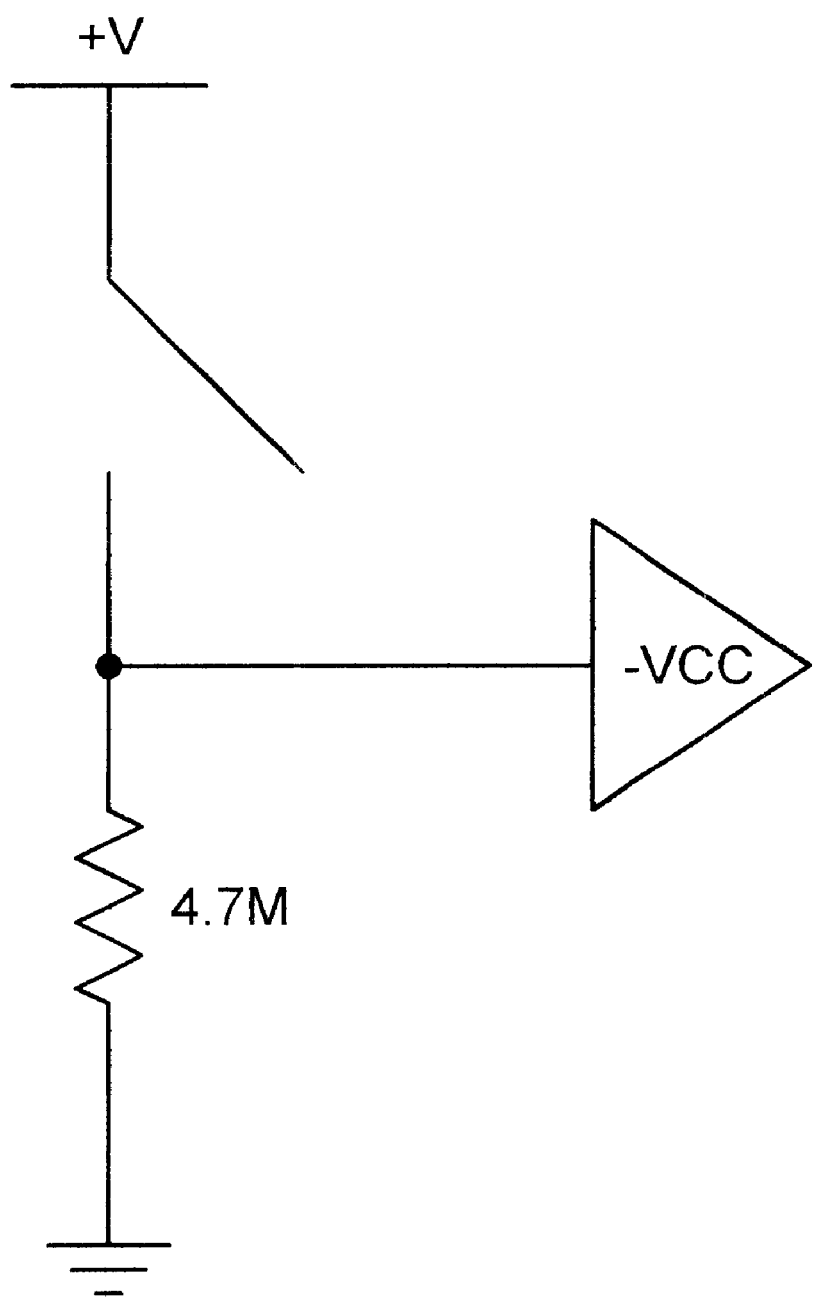
FIG. 1 is a prior art configuration of a high impedance encoder for a utility meter.
Figure 2:
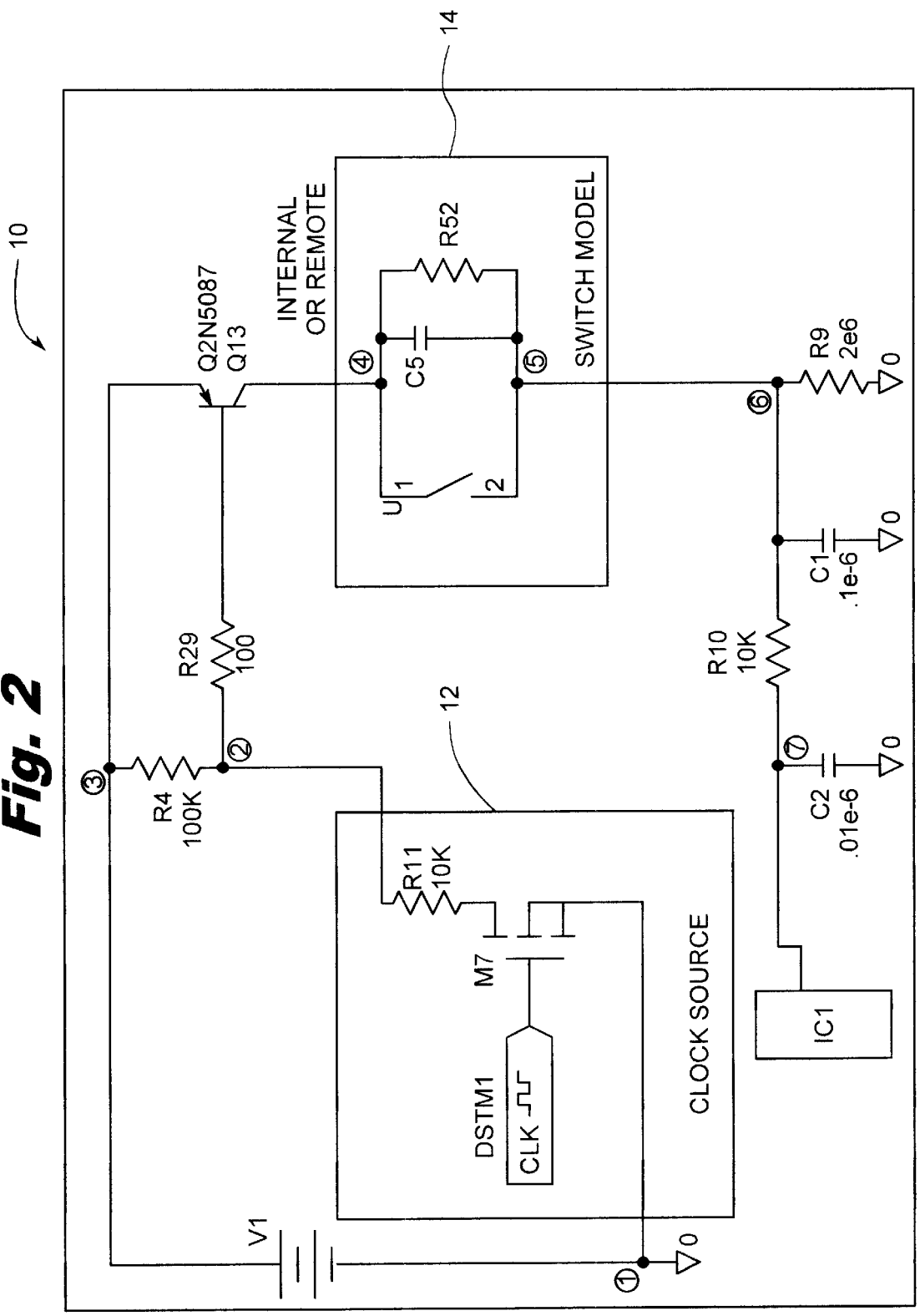
FIG. 2 is a low impedance encoder for a utility meter of the present invention.
Figure 3:
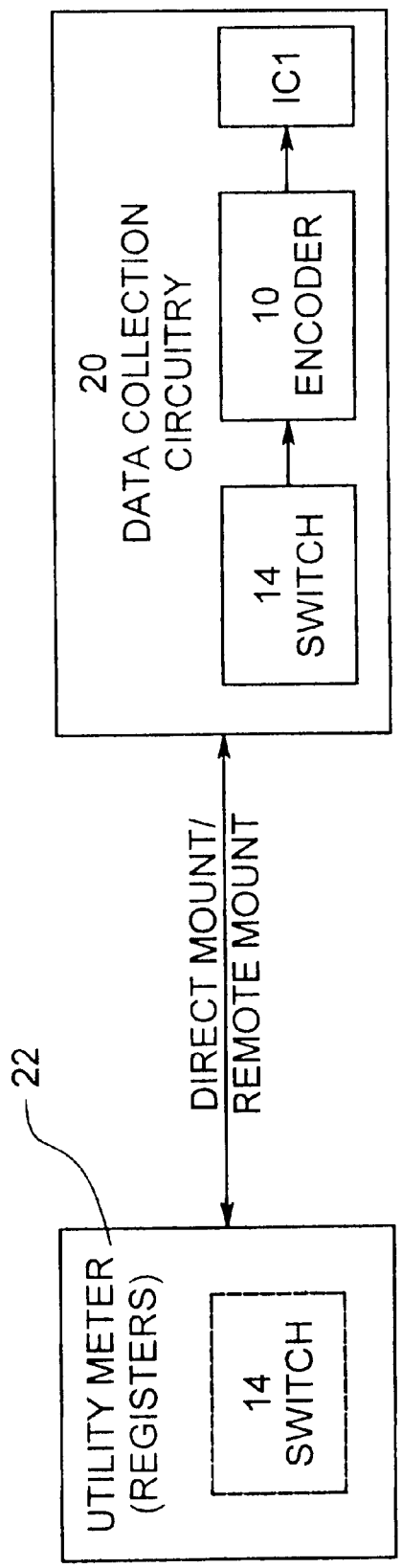
FIG. 3 is a block diagram of a utility meter utilizing the low impedance encoder of the present invention.

Referring to FIGS. 2 and 3, a low impedance encoder 10 of the present invention is depicted. The low impedance encoder is designed for use with the data collection circuitry 20 of utility meters 22, and is particularly suited for water meters whose registers are remotely located from its corresponding data collection circuitry via cable. The low impedance encoder utilizes duty cycle monitoring of a switch thereby allowing higher currents over a duty cycle period than could be afforded if current was drawn continuously.

As shown, the low impedance encoder 10 generally comprises a clock source 12 that is connected between nodes 1 (ground) and 2. A voltage source V1 is connected between nodes 1 and 3. A resistor R4 is connected between nodes 2 and 3 while a resistor R29 is connected between node 2 and the base of a transistor Q13. The emitter of Q13 is tied to resistor R4 and voltage source V1 at node 3. The collector is tied to the first side of a switch 14 at node 4 while the second side of switch 14, indicated as node 5, is connected to the parallel combination of a resistor R9 and capacitor C1 at node 6, each of which are tied to ground, node 1. A resistor R10 is connected between nodes 6 and 7 while a capacitor C2 extends between node 7 and ground, node 1. Node 7 is further tied to an integrated circuit IC1, preferably an Itron ASIC having Itron part number ICS-0021-001, or equivalent, used within Itron ERTs® available from Itron, Inc. of Spokane, Wash.

Clock source 12 is depicted as comprising a pulse generator DSTM1 that is tied to the gate of a MOSFET M7, the drain of which is tied via resistor R11 (10 kiloOhms) to node 2, and the source of which is tied to node 1. Of course, other clock sources may be used without departing from the spirit or scope of the invention. Switch 14 may be either internal to the encoder circuitry or remote from the remaining encoder circuitry, as reflected by the solid line block and dashed line block, respectively of FIG. 3. A model of a switch is depicted in FIG. 2 and includes not only the switch itself, having a terminal 1 and a terminal 2, but a capacitor C5, which is representative of large stray capacitances that are commonly found in remote applications where long lengths of cable are required between the switch and the rest of the encoder circuit, and a parallel resistor R52, which is representative of the leakage resistance of the switch. Note that switch 14 is preferably a reed switch, however, other switches may be used without departing from the spirit or scope of the operation.

By way of non-limiting example, Table 1 below provides a listing of the components of the low impedance and their preferred values, however, it should be noted that other component values may be used without departing from the spirit or scope of the invention.

TABLE 1

| Component | Component Value |
|---|---|
| Resistor R4 | 100 kiloOhms |
| Resistor R29 | 100 Ohms |
| Resistor R9 | 2 megaOhms |
| Capacitor C1 | 0.1 microFarads |
| Resistor R10 | 10 kiloOhms |
| Capacitor C2 | 0.01 microFarads |

In operation, clock source 12 preferably produces a pulse duration of 15 microseconds for a pulse period of 7.8 milliseconds to produce a duty cycle of 15 us/7.8 ms or 0.0192. It should be noted that other pulse durations, pulse periods, and duty cycles may be used without departing from the spirit or scope of the invention. The output of clock source 12 is presented to resistors R4, and R29, which operate as pull-up resistors to keep the clock pulse at a desired voltage level for presentation to transistor Q13. When the clock pulse is high, transistor Q13 is on. If switch 14 is closed when transistor Q13 is on, current passes through switch 14 and charges capacitor C1. If switch 13 is open when transistor Q13 is on, current does not pass through switch 14 and resistor R9 operates to discharge capacitor C1 according to the time constant of:

$$\tau = (R9)(C1) = (2 \times 10^6)(0.1 \times 10^{-6}) = 0.2 \text{ sec} \quad \text{Eq.(1)}$$

Note that the time constant and particularly C1 are selected to avoid the effects of switch bounce. When closing, the contacts of a reed switch will initially bounce or chatter before reaching a stable closed state, as such, C1 is selected to be large enough so that the time to store charge is longer than the period in which switch bounce might occur.

If switch 14 is closed when transistor 13 is on and capacitor C1 has been charged, current passes to a low pass filter formed by resistor R10 and capacitor C2, which along with resistor R9 and capacitor C1 effectively filters transient and high impedance spikes. The signal passing through the low pass filter is then used to latch integrated circuit IC1 thereby producing a count and a measurement of the utility being supplied. If switch 14 is open when transistor 13 is on and capacitor Cl has been discharged, integrated circuit IC1 is unlatched at the end of the duty cycle.

The duty cycling, in combination with the R9C1 discharge time constant, assures that every time the transistor Q13 turns on, capacitor C1 has discharged enough to allow for a substantial current through the switch to charge up capacitor C1 again. This ensures that every time the switch is sampled it provides a relatively low impedance in order to continue to look closed. This especially important with reed switches, which can be mechanically closed, but electrically fluctuating in a high impedance state; the electrical fluctuation causing errors in high impedance encoders. High current pulses through a reed switch, required to charge capacitor C1, effectively require the switch to be low impedance when closed. By driving a reed switch with high current, reed switch anomalies are drastically reduced, improving reed switch performance.

To explain further, in a high impedance circuit during switch opening, a reed switch can fluctuate between electrically open (very high impedance) and electrically closed (high impedance) while still mechanically closed. By providing the low impedance duty cycling, or sampling, to the reed switch, during switch opening after the reed switch goes electrically open (whether very high impedance or high impedance), the likelihood of the reed switch returning to a low impedance electrically closed state again is very small. As such, the low impedance encoder of the present invention operates to significantly reduce the number of switch closure count errors.

Additional benefits are provided by the low impedance encoder of the present invention. For instance, while the transistor Q13 is on and the reed switch 14 is closed, the circuit is a low impedance "high." However, looking into terminal 2, due to capacitor C1, at high frequencies, the circuit remains at relatively low impedance regardless of switch position or transistor state. This feature of maintaining low impedance provides an effective full-time deterrent against transients or electrostatic discharge (ESD). Moreover, when looking from the reed switch 14 into the collector of transistor Q13, the circuit looks to be at high impedance except when transistor Q13 is on. In the case of remote switches 14 or encoders 10, this provides a barrier to unwanted signals getting into encoder 10.

Further, the topology of low impedance encoder 10 is such that it provides protection against leakage resistance, represented by R52. Specifically, if switch 14 normally has a leakage resistance R52, the effective resistance becomes R52/duty cycle, or very large for a small duty cycle. This allows resistor R52 to become relatively small and still appear large, allowing low impedance encoder 10 to continue to count properly. Note that cable capacitance, represented by C5, will influence the effective value of resistor R52.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed:

1. A low impedance encoder for use with a utility meter, wherein said encoder comprises:
   a clock source, wherein said clock source operates according to a predetermined duty cycle;
   a switch, having a first and a second position, wherein said duty cycle controls a current flow to said switch, and wherein a high current flow through said switch indicates said switch is in said first position and the consumption of a utility as registered by said utility meter has occurred, and wherein a low current flow through said switch indicates said switch is in said second position.

2. The low impedance encoder of claim 1, wherein said switch is in a location according to a group consisting of: a location internal to said encoder and a location remote to said encoder.

3. The low impedance encoder of claim 1, wherein said utility meter is selected from a group consisting of: a water meter, a gas meter, and an electric meter.

4. The low impedance encoder of claim 1, wherein said utility meter consists of a water meter.

5. The low impedance encoder of claim 4, wherein said water meter is remote from said low impedance encoder.

6. The low impedance encoder of claim 1, wherein said duty cycle operates to substantially minimize current consumption by said low impedance encoder.

7. A data collection unit for a utility meter, comprising:
   a low impedance encoder, said low impedance encoder comprising:
      a clock source, wherein said clock source operates according to a predetermined duty cycle;
      a switch, having a first and a second position, wherein said duty cycle controls a current flow to said switch, and wherein a high current flow through said switch indicates said switch is in said first position and the consumption of a utility as registered by said utility meter has occurred, and wherein a low current flow through said switch indicates said switch is in said second position; and
   a counter, wherein said counter counts the number of times said switch has been in said first position.

8. The low impedance encoder of claim 7, wherein said switch is in a location according to a group consisting of: a location internal to said encoder and a location remote to said encoder.

9. The low impedance encoder of claim 7, wherein said utility meter is selected from a group consisting of: a water meter, a gas meter, and an electric meter.

10. The low impedance encoder of claim 7, wherein said utility meter consists of a water meter.

11. The low impedance encoder of claim 10, wherein said water meter is remote from said low impedance encoder.

12. The low impedance encoder of claim 7, wherein said duty cycle operates to substantially minimize current consumption by said low impedance encoder.

13. A low impedance encoding means for use with utility metering means, wherein said utility metering means for registering the deliver of a utility, wherein said encoding means comprises:
   clock means for producing a clock pulse according to a predetermined duty cycle; and
   switching means for switching between a first and a second position, said duty cycle controlling a current flow to said switching means, wherein a high current flow through said switching means indicating said switching means is in said first position and the consumption of said utility as registered by said utility meter has occurred, and wherein a low current flow through said switching means indicating said switching means is in said second position.

14. The encoding means of claim 13, wherein said switching means is in a location according to a group consisting of: a location internal to said encoding means and a location remote to said encoding means.

15. The encoding means of claim 13, wherein said utility metering means is selected from a group consisting of: water metering means for registering water consumption, gas metering means for registering gas consumption, and electric metering means for registering consumption of electricity.

16. The encoding means of claim 13, wherein said utility metering means consists of water metering means for registering consumption of water.

17. The encoding means of claim 16, wherein said water metering means is remote from said encoding means.

18. The encoding means of claim 13, wherein said duty cycle operates to substantially minimize current consumption by said encoding means.

19. A utility meter, comprising:
   a register;
   a data collection unit in communication with said register, said data collection unit comprising:
      a low impedance encoder, said low impedance encoder comprising:
         a clock source, wherein said clock source operates according to a predetermined duty cycle;
         a switch, having a first and a second position, wherein said duty cycle controls a current flow to said switch, and wherein a high current flow through said switch indicates said switch is in said first position and the consumption of a utility as registered by said utility meter has occurred, and wherein a low current flow through said switch indicates said switch is in said second position; and
      a counter, wherein said counter counts the number of times said switch has been in said first position.

* * * * *